(12) United States Patent
Dai et al.

(10) Patent No.: US 11,984,599 B2
(45) Date of Patent: May 14, 2024

(54) ELECTRODE COMPONENTS WITH LASER INDUCED SURFACE MODIFIED CURRENT COLLECTORS AND METHODS OF MAKING THE SAME

(71) Applicant: GM GLOBAL TECHNOLOGY OPERATIONS LLC, Detroit, MI (US)

(72) Inventors: Fang Dai, Troy, MI (US); Hongliang Wang, Sterling Heights, MI (US); Shuru Chen, Troy, MI (US); Qinglin Zhang, Novi, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 16/698,303

(22) Filed: Nov. 27, 2019

(65) Prior Publication Data

US 2021/0159502 A1 May 27, 2021

(51) Int. Cl.
*H01M 4/62* (2006.01)
*H01M 4/02* (2006.01)
(Continued)

(52) U.S. Cl.
CPC .......... *H01M 4/62* (2013.01); *H01M 4/0404* (2013.01); *H01M 4/0471* (2013.01);
(Continued)

(58) Field of Classification Search
CPC .... H01M 4/62; H01M 4/0404; H01M 4/0471; H01M 4/0492; H01M 4/134;
(Continued)

(56) References Cited

U.S. PATENT DOCUMENTS

| 8,974,946 B2 | 3/2015 | Cai et al. |
| 9,160,036 B2 | 10/2015 | Yang et al. |

(Continued)

FOREIGN PATENT DOCUMENTS

| AU | 2012236227 A1 * | 11/2013 | ............. C04B 35/45 |
| CN | 105428638 A | 3/2016 | |

(Continued)

OTHER PUBLICATIONS

Luan et al. ("Plasma-Strengthened Lithiophilicity of Copper Oxide Nanosheet-Decorated Cu Foil for Stable Lithium Metal Anode"), Adv. Sci. 2019, 6, 1901433 (Year: 2019).*

(Continued)

*Primary Examiner* — Matthew T Martin
*Assistant Examiner* — Paul Christian St Wyrough
(74) *Attorney, Agent, or Firm* — Harness, Dickey & Pierce, P.L.C.

(57) ABSTRACT

An electrode component for an electrochemical cell is provided herein. The electrode component includes a current collector having a first surface, a metal oxide layer disposed on the first surface of the current collector, and a lithium-containing layer bonded to the first surface of the current collector. The metal oxide layer includes a plurality of features. A method for manufacturing such an electrode component is also provided herein. The method includes directing a laser beam toward the first surface of the current collector in the presence of oxygen to form the metal oxide layer on the first surface and applying the lithium-containing layer to the metal oxide layer thereby bonding the lithium-containing layer with the current collector.

9 Claims, 8 Drawing Sheets

(51) Int. Cl.
  *H01M 4/04*    (2006.01)
  *H01M 4/134*   (2010.01)
  *H01M 4/1395*  (2010.01)
  *H01M 4/38*    (2006.01)
  *H01M 4/66*    (2006.01)
  *H01M 10/0525* (2010.01)

(52) U.S. Cl.
  CPC ......... *H01M 4/0492* (2013.01); *H01M 4/134* (2013.01); *H01M 4/1395* (2013.01); *H01M 4/382* (2013.01); *H01M 4/661* (2013.01); *H01M 10/0525* (2013.01); *H01M 2004/027* (2013.01)

(58) Field of Classification Search
  CPC .... H01M 4/1395; H01M 4/382; H01M 4/661; H01M 10/0525; H01M 2004/027
  See application file for complete search history.

(56) References Cited

U.S. PATENT DOCUMENTS

| | | | |
|---|---|---|---|
| 9,252,411 B2 | 2/2016 | Abd Elhamid et al. | |
| 9,373,829 B2 | 6/2016 | Xiao et al. | |
| 9,647,254 B2 | 5/2017 | Dadheech et al. | |
| 9,742,028 B2 | 8/2017 | Zhou et al. | |
| 9,923,189 B2 | 3/2018 | Xiao | |
| 9,929,435 B2 | 3/2018 | Cai et al. | |
| 9,979,008 B2 | 5/2018 | Dai et al. | |
| 10,084,204 B2 | 9/2018 | Dai et al. | |
| 10,128,481 B2 | 11/2018 | Xiao et al. | |
| 10,199,643 B2 | 2/2019 | Zhou et al. | |
| 10,312,501 B2 | 6/2019 | Yang et al. | |
| 10,326,166 B2 | 6/2019 | Yang et al. | |
| 10,367,201 B2 | 7/2019 | Yang et al. | |
| 10,396,360 B2 | 8/2019 | Xiao et al. | |
| 10,434,894 B2 | 10/2019 | Li et al. | |
| 10,497,927 B2 | 12/2019 | Xiao et al. | |
| 10,797,301 B2 | 10/2020 | Dai et al. | |
| 2005/0106465 A1 | 5/2005 | Minami et al. | |
| 2014/0375325 A1 | 12/2014 | Wang et al. | |
| 2015/0056387 A1 | 2/2015 | Dadheech et al. | |
| 2015/0056493 A1 | 2/2015 | Dadheech et al. | |
| 2015/0349307 A1 | 12/2015 | Dadheech et al. | |
| 2016/0172706 A1 | 6/2016 | Xiao et al. | |
| 2016/0172710 A1 | 6/2016 | Liu et al. | |
| 2016/0380259 A1* | 12/2016 | Yang | B23K 26/127 429/223 |
| 2017/0162859 A1 | 6/2017 | Yang et al. | |
| 2017/0214079 A1 | 7/2017 | Dai et al. | |
| 2017/0271678 A1 | 9/2017 | Yang et al. | |
| 2018/0062206 A1 | 3/2018 | Yang et al. | |
| 2018/0073158 A1* | 3/2018 | Li | B23K 26/355 |
| 2018/0108952 A1 | 4/2018 | Yang et al. | |
| 2018/0309165 A1 | 10/2018 | Yersak et al. | |
| 2018/0309166 A1 | 10/2018 | Yersak et al. | |
| 2018/0375148 A1 | 12/2018 | Yersak et al. | |
| 2019/0044134 A1 | 2/2019 | Liu et al. | |
| 2019/0058210 A1 | 2/2019 | Dai et al. | |
| 2019/0058211 A1 | 2/2019 | Yang et al. | |
| 2019/0058215 A1 | 2/2019 | Dai et al. | |
| 2019/0058219 A1 | 2/2019 | Yang et al. | |
| 2019/0067675 A1 | 2/2019 | Xiao | |
| 2019/0067744 A1 | 2/2019 | Xiao et al. | |
| 2019/0089006 A1 | 3/2019 | Yang et al. | |
| 2019/0193339 A1 | 6/2019 | Wang et al. | |
| 2019/0207205 A1 | 7/2019 | Adair et al. | |
| 2019/0207208 A1 | 7/2019 | Dai et al. | |
| 2019/0207211 A1 | 7/2019 | Dai et al. | |
| 2019/0207245 A1 | 7/2019 | Adair et al. | |
| 2019/0207261 A1 | 7/2019 | Yang et al. | |
| 2019/0225092 A1 | 7/2019 | Li et al. | |
| 2019/0226859 A1 | 7/2019 | Li et al. | |
| 2019/0232251 A1 | 8/2019 | Dailly et al. | |
| 2019/0312255 A1 | 10/2019 | Dai et al. | |
| 2019/0319242 A1 | 10/2019 | Dadheech et al. | |
| 2019/0329353 A1 | 10/2019 | Dai et al. | |
| 2020/0070269 A1 | 3/2020 | Wang et al. | |
| 2020/0099039 A1* | 3/2020 | Kaskel | C23C 30/005 |
| 2021/0101231 A1* | 4/2021 | Hayden | B23K 26/40 |
| 2021/0159502 A1* | 5/2021 | Dai | H01G 11/28 |

FOREIGN PATENT DOCUMENTS

| | | | | |
|---|---|---|---|---|
| CN | 107579204 A | * | 1/2018 | ............. Y02E 60/10 |
| CN | 108447695 A | | 8/2018 | |
| CN | 109742323 A | * | 5/2019 | ............. Y02E 60/10 |
| CN | 107221637 B | * | 7/2019 | ........ H01M 10/0525 |
| CN | 110364678 A | | 10/2019 | |
| CN | 112864348 A | | 5/2021 | |
| DE | 102020127847 A1 | | 5/2021 | |
| JP | 11297331 A | * | 10/1999 | |
| WO | WO-2019072811 A1 | * | 4/2019 | |
| WO | WO-2019210596 A1 | * | 11/2019 | ........ H01M 10/0525 |

OTHER PUBLICATIONS

Liang et al. (J. Mater. Chem. A, In situ preparation of a binder-free nano-cotton like CuO-Cu integrated anode on a current collector by laser ablation oxidation for long cycle life Li-ion batteries, 2017, 5,19781-19789) (Year: 2017).*
AU 2012236227 A1 (machine translation) (Year: 2013).*
Y. Zheng, Z. An, P. Smyrek, H. J. Seifert, T. Kunze, V. Lang, A.-F. Lasagni, W. Pfleging, "Direct laser interference patterning and ultrafast laser-induced micro/nano structuring of current collectors for lithium-ion batteries," 2016 (Year: 2016).*
JP11297331A (translation) (Year: 1999).*
Wang, Hongliang et al., U.S. Appl. No. 16/117,265, filed Aug. 30, 2018 entitled "Laser-Induced Anti-Corrosion Micro-Anchor Structural Layer for Metal-Polymeric Composite Joint and Methods of Manufacturing Thereof," 63 pages.
First Office Action for Chinese Patent Application No. 202011361779.1 dated Sep. 28, 2023, with correspondence from China Patent Agent (H.K.) Ltd. summarizing Office Action; 13 pages.

* cited by examiner

ELECTRODE COMPONENTS WITH LASER INDUCED SURFACE MODIFIED CURRENT COLLECTORS AND METHODS OF MAKING THE SAME

INTRODUCTION

This section provides background information related to the present disclosure which is not necessarily prior art.

High-energy density, electrochemical cells, such as lithium ion batteries, can be used in a variety of consumer products and vehicles, such as Hybrid Electric Vehicles (HEVs) and Electric Vehicles (EVs). Typical lithium ion batteries comprise a first electrode (e.g., a cathode), a second electrode of opposite polarity (e.g., an anode), an electrolyte material, and a separator. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling the anode function may be associated with the positive electrode rather than negative electrode (e.g., the negative electrode may be an anode on discharge and a cathode on charge).

Many different materials may be used to create components for a lithium ion battery. Common negative electrode materials include lithium insertion materials or alloy host materials, like carbon-based materials, such as lithium-graphite intercalation compounds, or lithium-silicon compounds, lithium-tin alloys, and lithium titanate (LTO) (e.g., $Li_{4+x}Ti_5O_{12}$, where $0 \leq x \leq 3$, such as $Li_4Ti_5O_{12}$). The negative electrode may also be made of metallic lithium (often referred to as a lithium metal anode (LMA)), so that the electrochemical cell is considered a lithium metal battery or cell. Use of metallic lithium in the negative electrode of a rechargeable battery has various potential advantages, including having the highest theoretical capacity and lowest electrochemical potential. Thus, batteries incorporating lithium metal anodes can have a higher energy density potentially doubling storage capacity and halving the size of the battery, while maintaining a similar cycle life as other lithium ion batteries. Lithium metal batteries are thus one of the most promising candidates for high energy storage systems.

However, lithium metal batteries also have potential downsides in some instances. For example, the comparatively high level of reactivity of the lithium metal may result in interfacial instability and undesired side reactions. Side reactions may occur between the lithium metal and various species the lithium metal may be exposed to during manufacture and/or operation of the electrochemical cell. Such side reactions may promote unfavorable dendrite formation. Another potential source of diminished performance in lithium metal batteries may result from weak long-term adhesion of the lithium metal to a metal current collector of the negative electrode. In some instances, the weak long-term adhesion may result in undesirable increases in resistance and impedance during cell cycling.

Accordingly, it would be desirable to develop reliable, high-performance lithium-containing negative electrode materials for use in high energy electrochemical cells, and methods relating thereto, that improve long-term adhesion between the lithium metal and the metal current collector.

SUMMARY

This section provides a general summary of the disclosure, and is not a comprehensive disclosure of its full scope or all of its features.

The present disclosure relates to electrode components with laser induced surface modified current collectors and methods of making said electrode components.

In certain aspects, a method of manufacturing an electrode component for an electrochemical cell is provided herein. The method includes directing a laser beam toward a first surface of a current collector including a metal in the presence of oxygen to form a metal oxide layer on the first surface. The metal oxide layer includes a plurality of features. The method further includes applying a lithium-containing layer to the metal oxide layer. The lithium-containing layer forms a bond with the first surface of the current collector.

The metal can be selected from the group consisting of copper, nickel, titanium, iron, molybdenum, chromium, and a combination thereof, and the metal oxide can be selected from the group consisting of copper oxide, nickel oxide, titanium oxide, iron oxide, molybdenum oxide, chromium oxide, and a combination thereof.

The laser beam can have a power of greater than or equal to about 50 W, a scan speed of greater than or equal to about 1 mm/s, and a spot size of greater than or equal to about 20 µm.

The directing of the laser beam toward the first surface of the current collector can include moving the laser beam with respect to the current collector to create the plurality of features on the first surface.

The bond between the lithium-containing layer and the first surface of the current collector can be a mechanical bond, a chemical bond, or a combination thereof.

The plurality of features can be a plurality of mechanical interlock features which form a mechanical bond with the lithium-containing layer.

The heat can be applied to the lithium-containing layer before it is applied to the metal oxide layer, while it is applied to the metal oxide layer, after it is applied to the metal oxide layer or a combination thereof.

A bonding layer can be formed between the lithium-containing layer and the metal oxide layer. The bonding layer chemically bonds the lithium-containing layer to the metal oxide layer, and the bonding layer includes lithium oxide, the metal, or a combination thereof.

The lithium-containing layer can be a lithium foil or a lithium film.

In yet other aspects, an electrode component for an electrochemical cell is provided herein. The electrode component includes a current collector having a first surface, a metal oxide layer disposed on the first surface of the current collector, and a lithium-containing layer bonded to the first surface of the current collector. The current collector includes a metal, and the metal oxide layer includes a plurality of features.

The metal can be selected from the group consisting of copper, nickel, titanium, iron, molybdenum, chromium, and a combination thereof, and the metal oxide can be selected from the group consisting of copper oxide, nickel oxide, titanium oxide, iron oxide, molybdenum oxide, chromium oxide, and a combination thereof.

The bond between the lithium-containing layer and the first surface of the current collector can be a mechanical bond, a chemical bond, or a combination thereof.

The plurality of features can be a plurality of mechanical interlock features which form a mechanical bond with the lithium-containing layer.

The negative electrode component can further include a bonding layer disposed between the lithium-containing layer and the metal oxide layer. The bonding layer chemically bonds the lithium-containing layer to the metal oxide layer, and the bonding layer includes lithium oxide, the metal, or a combination thereof.

The lithium-containing layer can be a lithium foil or a lithium film.

In yet other aspects a lithium-containing electrochemical cell is provided herein. The lithium-containing electrochemical cell includes a negative electrode component, a positive electrode component spaced apart from the negative electrode component, a porous separator disposed between confronting surfaces of the negative electrode component and the positive electrode component, and a liquid electrolyte infiltrating the negative electrode component, the positive electrode component, and the porous separator. The negative electrode component includes a current collector having a first surface, a metal oxide layer disposed on the first surface of the current collector, and a lithium-containing layer bonded to the first surface of the current collector. The current collector includes a metal, and the metal oxide layer includes a plurality of features.

The metal can be selected from the group consisting of copper, nickel, titanium, iron, molybdenum, chromium, and a combination thereof, and the metal oxide can be selected from the group consisting of copper oxide, nickel oxide, titanium oxide, iron oxide, molybdenum oxide, chromium oxide, and a combination thereof. The lithium-containing layer can be a lithium foil or a lithium film.

The bond between lithium-containing layer and the first surface of the current collector can be a mechanical bond, a chemical bond, or a combination thereof.

The plurality of features can be a plurality of mechanical interlock features which form a mechanical bond with the lithium-containing layer.

The negative electrode component can further include a bonding layer disposed between the lithium-containing layer and the metal oxide layer. The bonding layer chemically bonds the lithium-containing layer to the metal oxide layer, and the bonding layer includes lithium oxide, the metal, or a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology contemplates an electrode component or assembly for an electrochemical cell and methods of making the same. An electrochemical cell may include a battery, capacitor, or super capacitor, by way of example. Suitable batteries may include lithium-ion, lithium sulfur, and lithium-lithium symmetrical batteries. High-energy density, electrochemical cells, such as lithium-based batteries, can be used in a variety of consumer products. In various instances, such electrochemical cells are used in vehicle applications. However, the present technology may also be employed in a wide variety of other applications. For example, devices in which such electrochemical cells may be used include an electric motor for a hybrid vehicle or an all-electrical vehicle, a laptop computer, a tablet computer, a cellular phone, and cordless power tools or appliances.

In various aspects, the present disclosure provides an electrode component, such as a lithium-based (Li-based) negative electrode component, and methods of formation related thereto. The electrode component includes a current collector comprising a metal and having a first surface and a metal oxide layer disposed on the first surface of the current collector. An electroactive lithium-containing layer can be disposed on or bonded to the first surface of the current collector. The metal in the metal current collector is optionally selected from the group consisting of: copper (Cu), nickel (Ni), iron (Fe), titanium (Ti), chromium (Cr), molybdenum (Mo), and combinations thereof. For example, the current collector may be formed of an iron alloy, such as stainless steel. Copper and nickel are particularly challenging metal substrates on which to form a lithium-containing layer, as such metals typically do not react with lithium at room temperature and have substantial nucleation overpotential. Current techniques for forming lithium-containing layers on such metal current collectors often involve treating the collectors with strong solvents (e.g., toluene or acetone) and acids (e.g., sulfuric acids). Such techniques commonly involve multiple, laborious processing steps, and even after treatment, the adhesion strength between the lithium-containing layer and the current collector can be low. If the bond between the lithium metal and current collector is not robust, resistance and impedance of the electrode will increase over time. The electrode component formed in accordance with various aspects of the present disclosure advantageously has improved adhesion between the lithium-containing layer and the current collector.

Figure 1A:
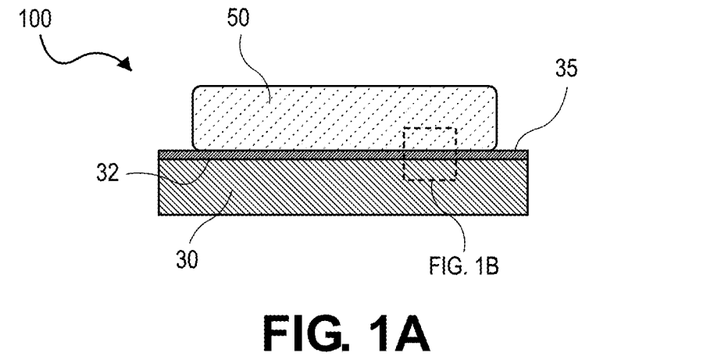
FIG. 1A is a cross-sectional view of an electrode component according to one aspect of the disclosure.

An example of an electrode component 100 formed in accordance with various methods of the present disclosure as discussed below is shown in FIG. 1A. The electrode component 100 includes a current collector 30 having a first surface 32. The current collector 30 is substantially parallel with a lithium-containing layer 50 and metal oxide layer 35 disposed therebetween, which bonds the current collector 30 to the lithium-containing layer 50. The metal oxide layer 35 is disposed on the first surface 32 of the current collector 30. The metal oxide layer 35 bonds and/or joins the lithium-containing layer 50 and the current collector 30 to form the electrode component 100. In any embodiment, the bond between the lithium-containing layer 50 and the current collector 30 can be a mechanical bond, a chemical bond, or a combination thereof. In certain aspects, the electrode component 100 may be a lithium-based negative electrode component.

In certain variations, the current collector 30 is a film or foil having a thickness ranging from about 1 µm to about 25 µm, and in certain aspects, optionally from about 5 µm to about 10 µm. The lithium-containing layer 50 may be a lithium film or lithium foil and may have an applied thickness ranging from about 1 µm to about 20 µm, and in certain aspects, optionally from about 2 µm to about 10 µm. As the skilled artisan will appreciate, the thickness of the lithium-containing layer 50 may increase during cycling of an electrochemical cell including the electrode component 100. For example, lithium present in the electrochemical cell may be plated onto the lithium-containing layer 50. Thus, the lithium-containing layer 50 may provide a thin initiator layer or strike-plate layer that promotes subsequent growth of lithium that may migrate from the electroactive material of the conjoined electrode or electrolyte system. While the thickness of the metal oxide layer 35 can vary depending on the parameters of the method by which it is formed, in various instances, the metal oxide layer 35 may have a thickness ranging from about 5 nm to about 5 µm, and in certain aspects, optionally from about 0.02 µm to about 1 µm.

The current collector 30 may comprise a metal selected from the group consisting of: copper (Cu), nickel (Ni), iron (Fe), titanium (Ti), chromium (Cr), molybdenum (Mo), and combinations thereof. In some embodiments, the metal may be formed of an iron alloy, such as stainless steel. The metal oxide layer 35 includes a metal oxide, for example, formed by exposing the first surface 32 of the current collector 30 to oxygen. The metal oxide may be selected from the group consisting of a copper oxide (e.g., $Cu_2O$, $CuO$, $CuO_2$, $Cu_2O_3$), a nickel oxide (e.g., $NiO$, $Ni_2O_3$), a titanium oxide (e.g, $TiO_2$, $TiO$ $Ti_2O_3$, $Ti_3O$, $Ti_2O$, $Ti_nO_{2n-1}$ where n ranges from 3-9 inclusive), an iron oxide (e.g., $FeO$, $FeO_2$, $Fe_3O_4$, $Fe_4O_5$, $Fe_5O_6$, $Fe_5O_7$, $Fe_{25}O_{32}$, $Fe_{13}O_{19}$, $Fe_2O_3$), a chromium oxide (e.g., $CrO$, $Cr_2O_3$, $CrO_2$, $CrO_3$, $CrO_5$, $Cr_8O_{21}$), a molybdenum oxide ($MoO_2$, $MoO_3$, $Mo_8O_{23}$, $Mo_{17}O_{47}$), and one or more combinations thereof.

Figure 1B:
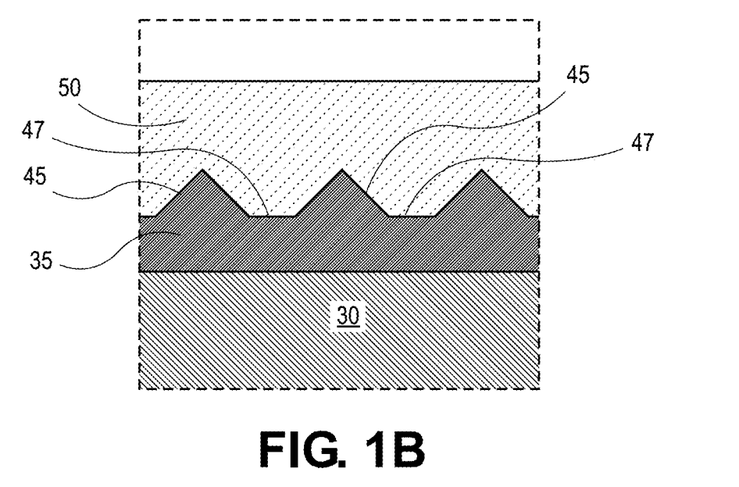
FIG. 1B is an exploded view of a portion of the electrode component of FIG. 1A.

As illustrated in FIG. 1B, the metal oxide layer 35 also includes a plurality of features 45. The features 45 may be in the shape of a substantially triangular peak with valleys 47 disposed between features 45. In some embodiments, the features 45 may have a substantially uniform shape or may be non-uniform in shape and define the same or different shapes. Similarly, valleys 47 may have a substantially uniform shape or may be non-uniform in shape and define the same or different shapes. In any embodiment, the plurality of features 45 may be a plurality of mechanical interlock features which form a mechanical bond with the lithium-containing layer 50 such that the lithium-containing layer 50 has increased adhesion with the current collector 30. For example, the plurality of features 45 as a plurality of mechanical interlock feature may be understood as type of a groove configuration to cause the lithium-containing layer 50 to interlock with the features 45 and valleys 47 of the metal oxide layer 35 thereby forming a mechanical bond between the lithium-containing layer 50 and the current collector 30. It is contemplated herein that other mechanical interlock shapes and designs may be used for interlocking the components together. For example, complementary protruding flanges, grooves, channels, locking wings of differing shapes could be used as mechanical interlock features. For example, the one or more interlock features can define a triangular shaped region, a quadrilateral shaped region, a toroid shaped region, a curved shaped region, or a combination thereof. The valleys 47 may define a triangular shaped region, a quadrilateral shaped region, a toroid shaped region, a curved shaped region, or a combination thereof.

Figure 1C:
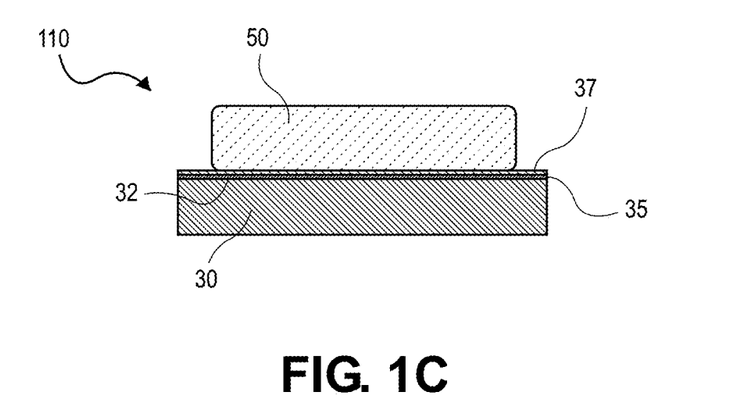
FIG. 1C is a cross-sectional view of an electrode component according to another aspect of the disclosure.

Additionally or alternatively, an electrode component may further include a bonding layer disposed between a lithium-containing layer and a current collector. For example, as illustrated in FIG. 1C, in electrode component 110, a bonding layer 37 may disposed between lithium-containing layer 50 and metal oxide layer 35. This bonding layer 37 may advantageously form a chemical bond between the lithium-containing layer 50 and the metal oxide layer 35 thereby providing further increased adhesion between the lithium-containing layer 50 and the current collector 30. The bonding layer 37 may be formed as the lithium-containing layer 50 is heated and applied to the current collector 30 as further described below. Thus, the bonding layer 37 may include lithium oxide (e.g., $LiO_2$) and metal from the current collector 30. For example, depending on the composition of the current collector 30, the metal in the bonding layer 37 may be selected from the group consisting of copper (Cu), nickel (Ni), iron (Fe), titanium (Ti), chromium (Cr), molybdenum (Mo), and combinations thereof. Although, bonding layer 37 is shown as a continuous discrete layer in FIG. 1C, it is contemplated herein that bonding layer 37 may be discontinuous and/or intermixed or dispersed with the metal oxide layer 35.

Figure 2:
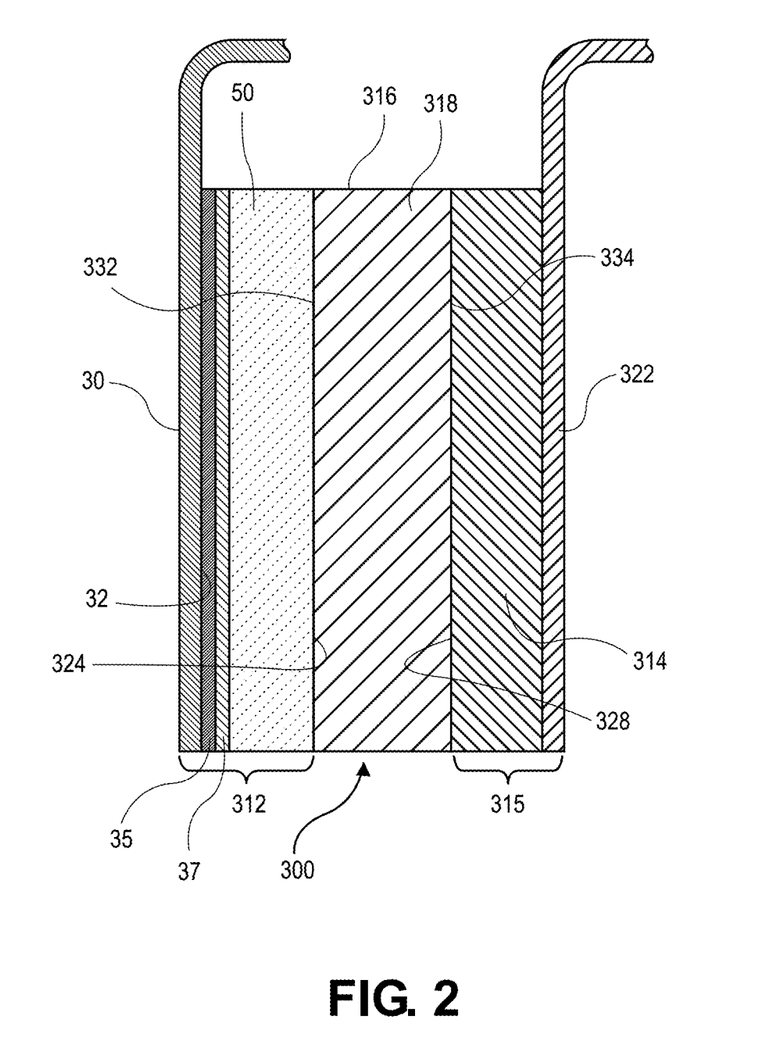
FIG. 2 is a cross-sectional view of a lithium-containing electrochemical cell according to one aspect of the disclosure.

In various aspects, an electrochemical cell for use in batteries, for example, a lithium ion battery or a lithium sulfur battery, or as capacitors is provided herein. The electrochemical cell can include an electrode component as described herein. For example, as best shown in FIG. 2, a lithium-containing electrochemical cell 300 (also referred to herein as "the electrochemical cell 300" or "cell 300") of a lithium ion battery (not shown) includes negative electrode component 312, a positive electrode component 315, a porous separator 316, and a liquid electrolyte 318 that impregnates, infiltrates, or wets the surfaces of and fills the pores of each of at least a portion of the negative electrode component 312, a portion of the positive electrode component 315, and the porous separator 316. A negative electrode current collector 30 as described herein is positioned adjacent and electrically coupled to a lithium containing layer 50 as described herein. The current collector 30 has a first surface 32 and a metal oxide layer 35 as described herein can be disposed on the first surface 32 of the current collector 30. The metal oxide layer 35 includes a plurality of features as described herein (not shown). The lithium containing layer 50 is bonded as described herein to the first surface 32 of the current collector 30. Optionally, the negative electrode component 312 includes a bonding layer 37 as described herein disposed between the lithium-containing layer 50 and the metal oxide layer 35.

The positive electrode component 315 is spaced apart from the negative electrode component 312. The positive electrode component 315 includes a positive electrode current collector 322 positioned adjacent and electrically coupled to a positive electrode layer 314. The positive electrode layer 314 may be coated, deposited, or otherwise formed on the major surface of the positive electrode current collector 322. The negative electrode component 312 includes an anterior surface 324, and the positive electrode component 315 includes an anterior surface 328 relative to the location of the separator 316. In assembly, the anterior surfaces 324, 328 of the negative and positive electrode components 312, 315 confront one another, with the separator 316 sandwiched between the confronting anterior surfaces 324, 328 of the negative and positive electrode components 312, 315. In particular, the separator 316 includes a first side 332 that faces toward the negative electrode component 312 and an opposite second side 334 that faces toward the positive electrode component 315.

The electrochemical cell 300 may have a thickness, measured from an outer surface of the negative electrode current collector 30 to an opposite outer surface of the positive electrode current collector 322 in the range of about 100 µm to about 1 mm. Individually, the current collectors 30, 322 may have thicknesses of about 20 µm and the porous separator 316 may have a thickness of about 25 µm.

In certain other variations, the electrochemical cell may be a supercapacitor, such as a lithium-ion based supercapacitor.

Figure 3:
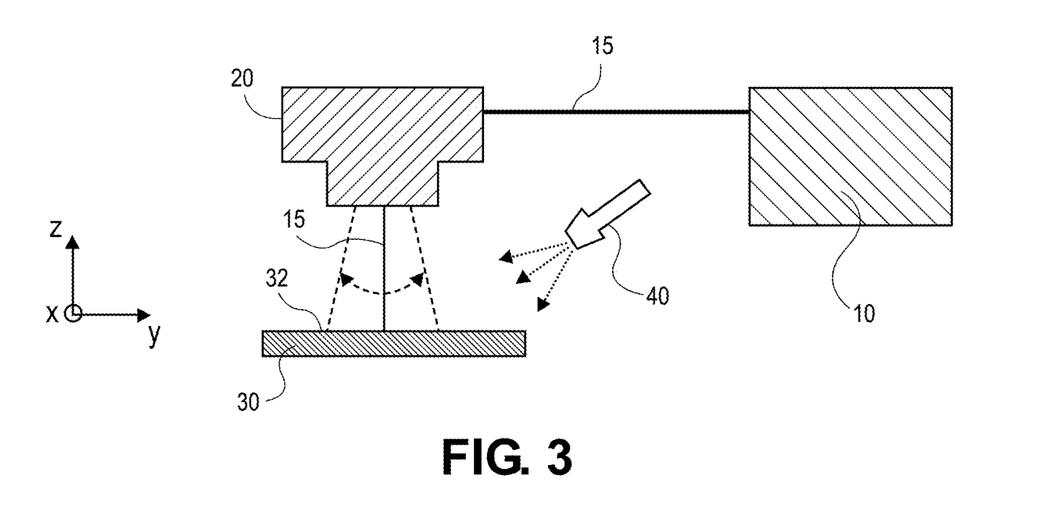
FIG. 3 is an illustration of a method of manufacturing an electrode component for an electrochemical cell according to one aspect of the disclosure.

In various aspects, the present disclosure provides a method of forming an electrode component as described above. For example, as shown in FIG. 3, the method includes directing a laser beam 15 from a laser source 10 to a first surface (e.g., first surface 32) of a current collector (e.g., current collector 30) as described herein comprising metal as described herein. The laser beam 15 can be directed toward the first surface 32 of the current collector 30 via a laser head 20, such as a scan head or scanner (e.g., one dimensional (1D) scanner, a two dimension scanner (2D)). The method can be performed in the presence of oxygen to form a metal oxide layer (e.g. metal oxide layer 35) (not shown) as described herein including a plurality of features (e.g., features 45) (not shown) as described herein on the first surface 32 of the current collector 30. Oxygen and/or air may be provided by an oxygen source 40, for example, a compressed oxygen ($O_2$) container or bottle.

In any embodiment, the current collector 30 may be placed on the focal plane of the laser beam 15. The laser beam 15 may be a nanosecond pulsed laser beam or an ultrafast laser beam, e.g., picosecond laser, femtosecond laser). The laser beam 15 may have a pulse width of greater than or equal to about 1 ns and less than or equal to about 1 µs, optionally greater than or equal to about 50 ns and less than or equal to about 500 ns, optionally greater than or equal to about 100 ns and less than or equal to about 250 ns, and optionally about 200 ns. The laser beam 15 may have a pulse overlap of greater than or equal to about 0% and less than or equal to about 90%, optionally greater than or equal to about 5% and less than or equal to about 75%, optionally greater than or equal to about 10% and less than or equal to about 50%, and optionally about 30%. The laser beam 15 may have a repetition rate of greater than or equal to about 1 kHz and less than or equal to about 1 MHz, optionally greater than or equal to about 10 kHz and less than or equal to about 750 kHz, optionally greater than or equal to about 100 kHz and less than or equal to about 500 kHz, and optionally about 20 kHz.

The laser beam 15 may create a spot size of greater than or equal to about 20 µm and less than or equal to about 1000 µm, optionally greater than or equal to about 40 µm and less than or equal to about 500 µm, optionally greater than or equal to about 60 µm and less than or equal to about 100 µm. The laser beam 15 may have a scan speed of greater than or equal to about 1 mm/s and less than or equal to about 15 m/s, optionally greater than or equal to about 100 mm/s and less than or equal to about 10 m/s, optionally greater than or equal to about 500 mm/s and less than or equal to about 5 m/s, and optionally greater than or equal to about 750 mm/s and less than or equal to about 1 m/s. The laser beam 15 may have a scan power of greater than or equal to about 50 W and less than or equal to about 2000 W, optionally greater than or equal to about 100 W and less than or equal to about 1000 W, optionally greater than or equal to about 200 W and less than or equal to about 500 W, and optionally greater than or equal to about 200 W and less than or equal to about 400 W.

In any embodiment, directing the laser beam 15 toward the first surface 32 of the current collector 30 produces the metal oxide layer as described herein including the plurality of features as described herein. For example, if the current collector comprises copper metal, the metal oxide layer formed on the first surface of the current collector is a copper oxide layer having a plurality of features. Similarly, if the current collector comprises nickel, the metal oxide layer formed on the first surface of the current collector is a nickel oxide layer having a plurality of features. The laser beam 15 may move relative to the current collector 30 as illustrated by the arrows in FIG. 3 to create a pattern, e.g., the plurality of features as described herein. For example, a laser head 20 may move the laser beam 15 while the current collector 30 remains stationary. In another example, the current collector 30 may be moved while the laser head 20 remains stationary.

The method further includes applying a lithium-containing layer (e.g., lithium-containing layer 50) as described herein on an exposed surface of the metal oxide layer on the current collector such that the lithium-containing layer forms a bond as described herein with the first surface of the current collector. In certain aspects, applying the lithium-containing layer onto the exposed surface of the metal oxide layer comprises contacting the lithium-containing layer to the surface of the metal oxide layer using a joining method selected from the group consisting of: lamination, thermal bonding, hot dipping, spot welding, laser welding, ultrasonic welding, and combinations thereof.

In various aspects, the lithium-containing layer may be cleaned prior to being applied to or disposed on the current collector. Lithium metal is a comparatively soft metal and highly reactive. Consequently, blasting the electrode with loose, hard abrasives may not be suitable for cleaning the lithium-containing layer. Further, in view of the high reactivity of lithium metals, it may also be appropriate to avoid the use of protic solvents (e.g., alcohols, acetone, ethers, and the like) when cleaning. Suitable cleaning processes may, therefore, include wiping the lithium-metal layer with an aprotic solvent (e.g., hexane), or other comparatively gentle cleaning techniques that do not undesirably react with the lithium metal.

In various aspects, applying the lithium-containing layer may include applying heat to the lithium-containing layer, the metal oxide layer, or both. Heat may be applied to the lithium-containing layer before it is applied to the metal oxide layer, while it is applied to the metal oxide layer, after it is applied to the metal oxide layer, or any combination thereof. Heating may result in formation of the bonding layer as described herein (e.g., bonding layer 37) wherein the bonding layer chemically bonds the lithium-containing layer to the metal oxide layer and the current collector, for example, via the reaction shown below:

$MO + 2Li \rightarrow LiO_2 + M$ wherein M represents the metal in the metal oxide layer. For example, if the metal oxide layer is a copper oxide layer, the bonding layer may include lithium oxide and copper. Thus, the heat may facilitate bonding between the lithium-containing layer and the current collector. While suitable heating temperatures and conditions depend on the materials used, in various instances, the applied heat may range from about 100° C. to about 300° C., and in certain aspects, optionally from about 140° C. to about 180° C. The heat may be applied for a time ranging from about 1 minute to about 15 minutes.

In certain aspects, the method may further include applying pressure to the lithium-containing layer, the bonding layer, the metal oxide layer, and/or the current collector. The applied pressure may compress the layers together and assist the bonding and/or adhesion of the current collector and the lithium-containing layer. In various instances, the pressure may be applied using rollers, platens, blades, and/or related methods. The applied pressure may range from about 0.1 MPa to about 5 MPa, and in certain aspects, optionally from about 0.1 MPa to about 1 MPa. The pressure may be applied for a time ranging from about 1 minute to about 15 minutes, and in certain aspects, optionally from about 1 minute to about 10 minutes. In certain aspects, the heat and the pressure may be applied simultaneously.

In various aspects, one or more of the method steps may be performed in an inert environment (e.g., argon (Ar)) and/or vacuum. For example, the applying or disposing of the lithium-containing layer onto the metal oxide layer disposed on the current collector and/or the heating of the lithium-containing layer, the metal oxide layer, and/or the current collection may occur in an inert environment and/or vacuum eliminating or minimizing lithium metal side reactions.

Figure 4:
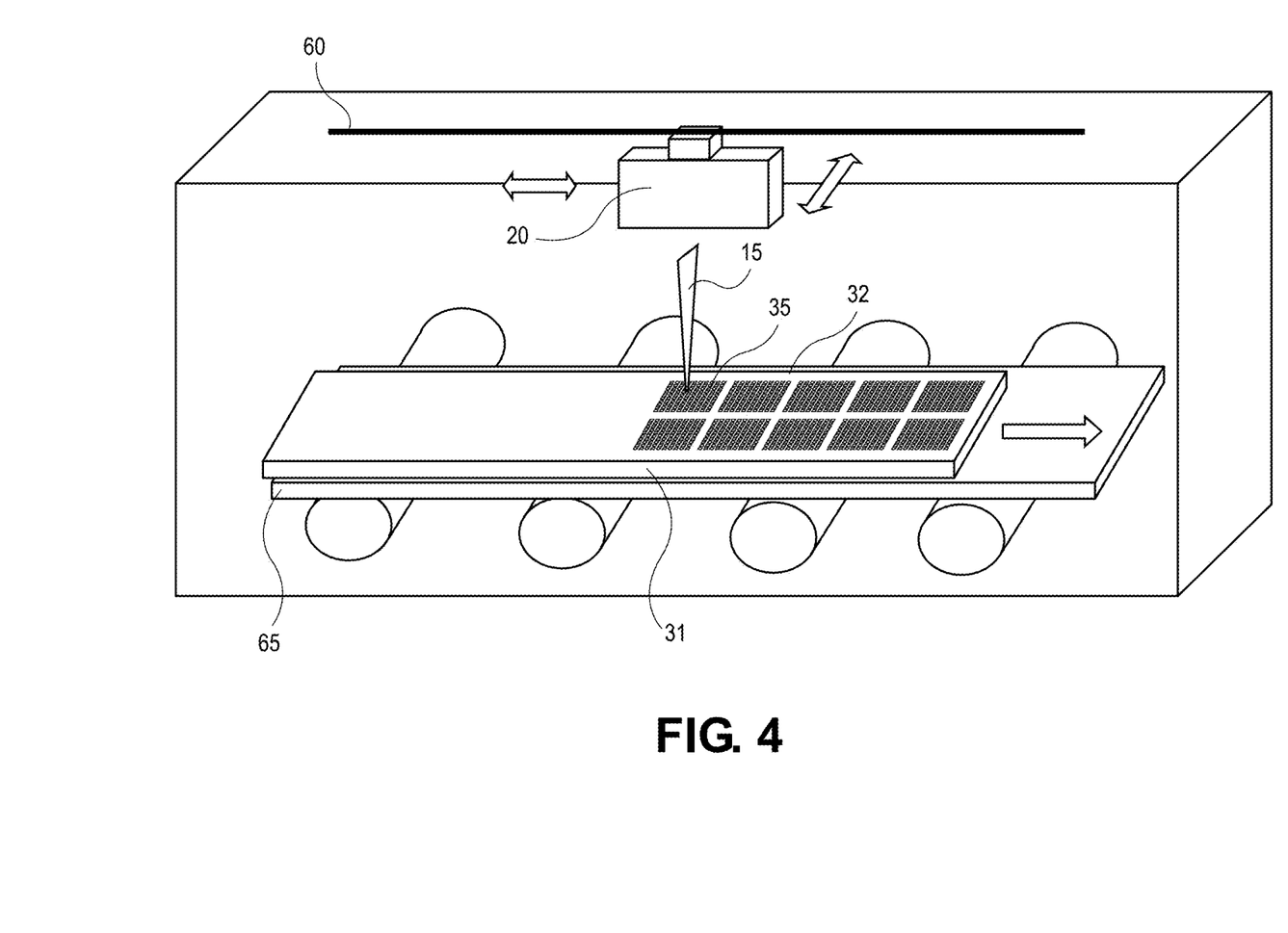
FIG. 4 is an illustration of a method of manufacturing an electrode component for an electrochemical cell according to another aspect of the disclosure.

As illustrated in FIG. 4, the method described herein can be incorporated into a continuous process for producing numerous electrode components. For example, a roll-to-roll process can be performed by moving a current collector sheet 31 on roller system 65 below laser head 20 attached to a gantry system 60. The laser head 20 can move in the direction(s) as illustrated by the arrows to create a pattern of the metal oxide layer 35 including a plurality of features as described herein on the first surface 32 of the current collector sheet 31.

EXAMPLES

Example 1

Figure 5A:
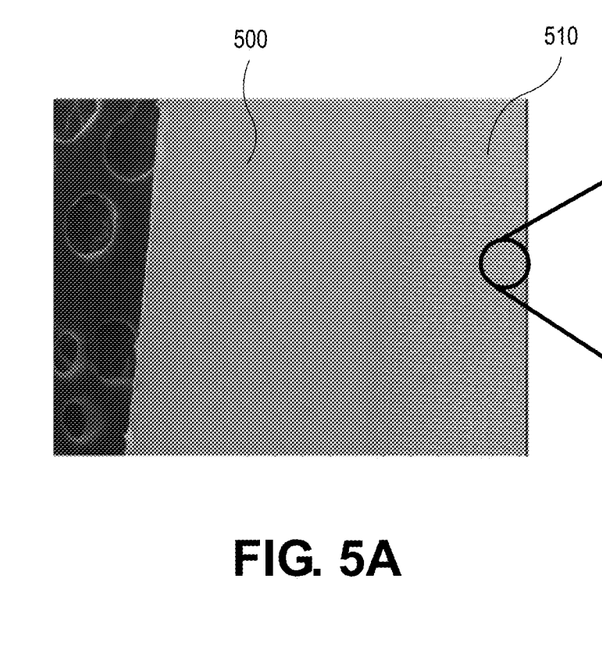
FIG. 5A is a scanning electron microscope (SEM) image of copper current collector surface after a portion has been laser treated according to one aspect of the disclosure.
Figure 5B:
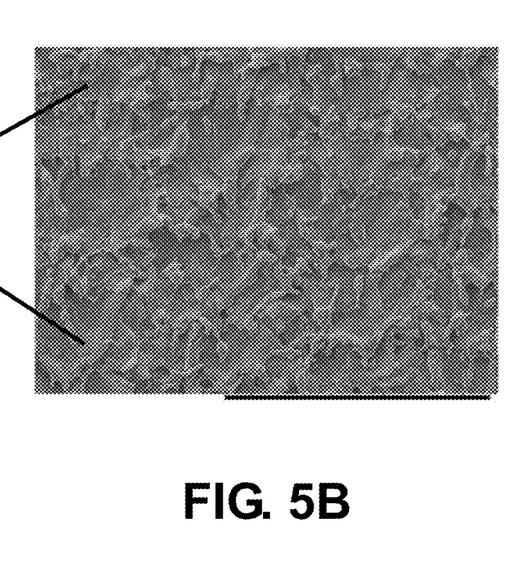
FIG. 5B is a magnified view of the SEM image of FIG. 5A of a laser-treated portion of the copper current collector.
Figure 6A:
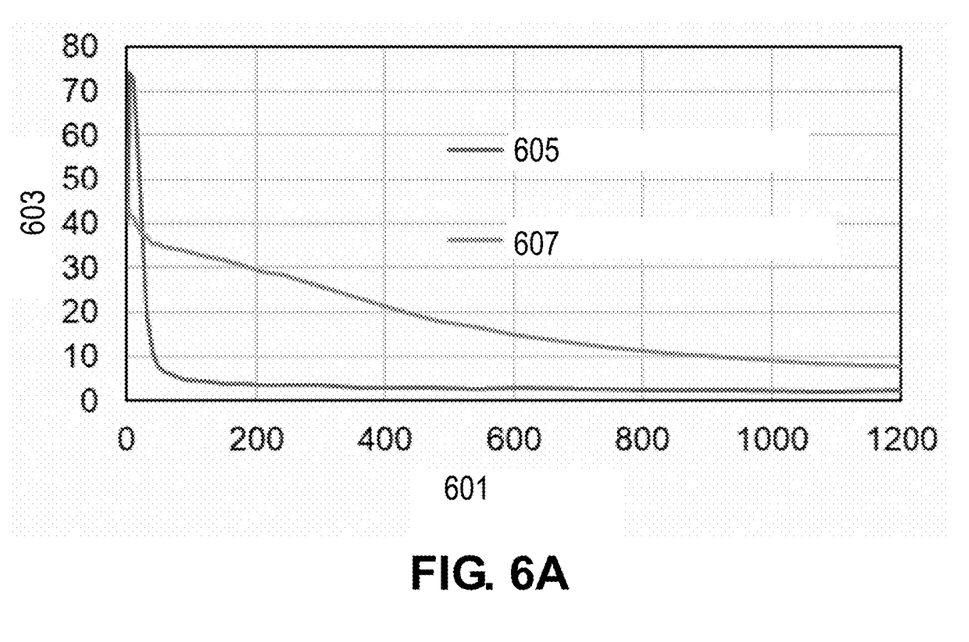
FIG. 6A depicts etch time (s) versus atomic percent (%) for the untreated portion of the copper current collector and the laser-treated portion of the copper current collector depicted in FIG. 5A.
Figure 6B:
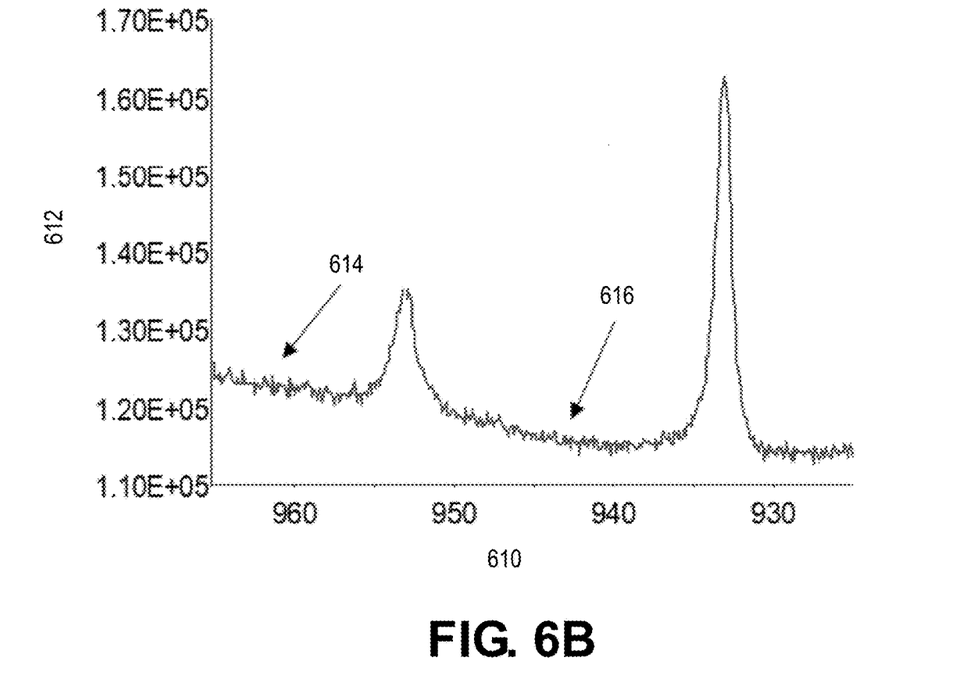
FIG. 6B depicts binding energy (eV) versus counts/second for the untreated portion of the copper current collector depicted in FIG. 5A.
Figure 6C:
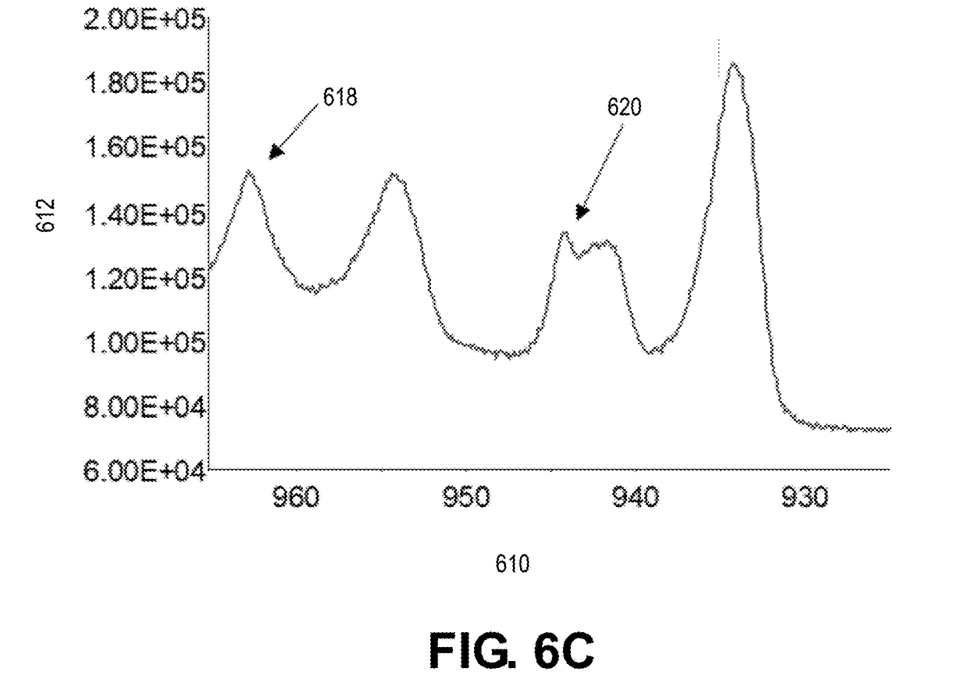
FIG. 6C depicts binding energy (eV) versus counts/second for the laser-treated portion of the copper current collector depicted in FIG. 5A.

Comparison of Laser-Treated Surface of Copper (Cu) Current Collector and Untreated Surface Cu Current Collector A portion of a surface of a Cu current collector is laser treated in the presence of oxygen (e.g., from a compressed $O_2$ bottle) with a nanosecond laser to form a CuO layer on the surface. The laser beam has a power of 270 W, a wavelength of 1064 nm, scan speed of 500 mm/s, a pulse width of 200 ns, a repetition rate of 20 kHz, an overlap of 30%, and a circular spot size of about 67 µm. The laser processing temperature is about 3500° C. A remaining portion of the Cu current collector is not laser treated. A scanning electron microscope (SEM) image of the Cu current collector is taken, and as shown in FIG. 5A, the untreated portion 500 of the Cu current collector has a smooth surface, and the laser-treated portion 510 of the Cu current collector includes a plurality of features. The plurality of features are more clearly depicted in FIG. 5B, which shows a magnified view of FIG. 5A. X-ray photoelectron spectroscopy (XPS) analysis to determine the amount of oxygen is performed on the untreated portion 500 and laser-treated portion 510. The XPS results are shown in FIG. 6A with line 605 corresponding to the untreated portion and line 607 corresponding to the laser-treated portion. The x-axis in FIG. 6A corresponds to etch time (s) 601 and the y-axis corresponds to atomic percent (%) 603. XPS analysis is also performed on the untreated portion 500 and laser-treated portion 510. The XPS results for the untreated portion 500 and the laser-treated portion 510 are shown in FIGS. 6B and 6C, respectively. The x-axis in FIGS. 6B and 6C corresponds to binding energy (eV) 610 and the y-axis corresponds to counts/s 612. FIG. 6C confirms the presence of CuO present on the surface of the laser-treated portion 510 with regions 618 and 620 indicating the presence of strong $Cu^{2+}$ from CuO. FIG. 6B confirms that no or little CuO is present on the surface of the untreated portion 500 with regions 614 and 616 indicating no $Cu^{2+}$.

Example 2

Peel Test

Figure 7A:
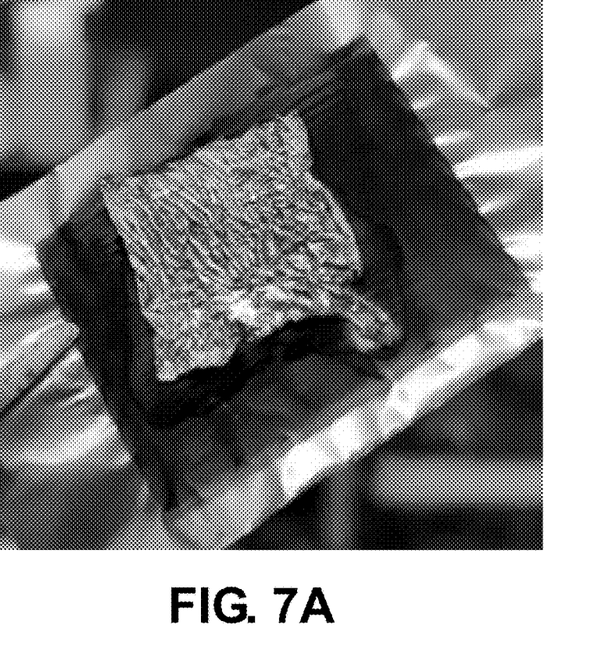
FIG. 7A is a photograph of a lithium-based electrode component prepared in accordance with the present disclosure after a peel test.
Figure 7B:
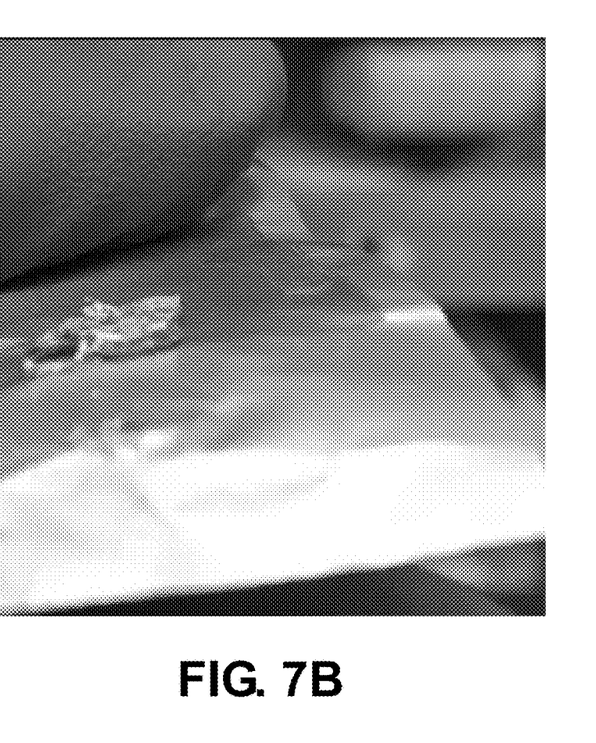
FIG. 7B is a photograph of conventional lithium-based electrode component after a peel test.

A peel test is performed on a conventional lithium-based electrode component and a lithium-based electrode component prepared in accordance with the present disclosure. In particular, the conventional lithium-based electrode component is prepared by applying a lithium layer to a Cu current collector, where the Cu current collector is not treated. The lithium-based electrode component prepared in accordance with the present disclosure is prepared by laser-treating a Cu current collector surface as described above in Example 1 to form a CuO layer and applying a lithium foil layer to laser-treated surface of the Cu current collector. As shown in FIG. 7A, the lithium-based electrode component prepared in accordance with the present disclosure showed excellent adhesion, while the conventional lithium-based electrode component experienced adhesion failure, as shown in FIG. 7B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing an electrode component for an electrochemical cell, the method comprising:
   directing a laser beam toward a first surface of a current collector comprising a metal in the presence of oxygen to form a metal oxide layer on the first surface, wherein the metal oxide layer is continuous and the metal oxide layer comprises a plurality of features; and
   applying a lithium-containing layer to the metal oxide layer, wherein the plurality of features is a plurality of mechanical interlock features which form a mechanical bond with the lithium-containing layer, wherein the plurality of mechanical interlock features comprise one or more features defining a triangular shaped region, a quadrilateral shaped region, a toroid shaped region, or a combination thereof and one or more valleys defining a triangular shaped region, a quadrilateral shaped region, a toroid shaped region, or a combination thereof.

2. The method of claim 1, wherein the metal is selected from the group consisting of copper, nickel, titanium, iron, molybdenum, chromium, and a combination thereof, and the metal oxide is selected from the group consisting of copper oxide, nickel oxide, titanium oxide, iron oxide, molybdenum oxide, chromium oxide, and a combination thereof.

3. The method of claim 1, wherein the laser beam has a power of greater than or equal to about 50 W, a scan speed of greater than or equal to about 1 mm/s, and a spot size of greater than or equal to about 20 μm.

4. The method of claim 1, wherein the directing the laser beam toward the first surface of the current collector comprises moving the laser beam with respect to the current collector to create the plurality of features on the first surface.

5. The method of claim 1, wherein heat is applied to the lithium-containing layer before it is applied to the metal oxide layer, while it is applied to the metal oxide layer, after it is applied to the metal oxide layer or a combination thereof.

6. The method of claim 5, wherein the heat applied to the lithium-containing layer forms a bonding layer between the lithium-containing layer and the metal oxide layer, wherein the bonding layer chemically bonds the lithium-containing layer to the metal oxide layer, and wherein the bonding layer comprises lithium oxide, the metal, or a combination thereof.

7. The method of claim 1, wherein the lithium-containing layer is a lithium foil or a lithium film.

8. The method of claim 1, wherein the plurality of mechanical interlock features comprise one or more features defining a triangular shaped region and one or more valleys defining a quadrilateral shaped region.

9. The method of claim 1, wherein the laser beam has a power of greater than or equal to about 100 W to less than or equal to about 1000 W, a scan speed of greater than or equal to about 100 mm/s to less than or equal to about 10 m/s, and a spot size of greater than or equal to about 60 μm to less than or equal to about 100 μm.

* * * * *